(12) United States Patent
Sudo et al.

(10) Patent No.: US 6,325,699 B1
(45) Date of Patent: Dec. 4, 2001

(54) LAPPING APPARATUS AND LAPPING METHOD

(75) Inventors: Koji Sudo; Yoshiaki Yanagida; Tomokazu Sugiyama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/426,534

(22) Filed: Oct. 26, 1999

(30) Foreign Application Priority Data

Apr. 15, 1999 (JP) .................................................. 11-108334

(51) Int. Cl.[7] ...................................................... B24B 49/00
(52) U.S. Cl. .................................. 451/8; 451/10; 451/11; 451/5
(58) Field of Search ................................. 451/1, 8, 5, 10, 451/11, 24, 57

(56) References Cited

U.S. PATENT DOCUMENTS

| 5,023,991 | 6/1991 | Smith . | |
| 5,175,938 | 1/1993 | Smith . | |
| 5,620,356 | * 4/1997 | Lackey et al. | 451/5 |
| 5,899,793 | * 5/1999 | Yanagida et al. | 451/8 |
| 6,045,431 | * 4/2000 | Cheprasov et al. | 451/5 |
| 6,196,897 | * 3/2001 | Suto et al. | 451/8 |

FOREIGN PATENT DOCUMENTS 10286765    10/1998  (JP) .

\* cited by examiner

*Primary Examiner*—Timothy V. Eley
*Assistant Examiner*—Dung Van Nguyen
(74) *Attorney, Agent, or Firm*—Greer, Burns & Crain, Ltd.

(57) ABSTRACT

Disclosed are a lapping apparatus and a lapping method for compensating for warp in a work to be lapped, wherein the warp of the work is compensated for during the lapping process. A warp quantity of the work is detected during the lapping process and compensation is made. Hence, even warp caused during the lapping process can be compensated. It is also feasible to save the task of measuring the warp quantity of the work before lapping. An air pressure mechanism for applying pressure to the work in accordance with an air supply pressure is used as a warp straightening mechanism, whereby a minute warp quantity can be compensated for and controlled to zero. With the air pressure mechanism being adopted, it is possible to prevent excessive pressure from being applied to a lap jig.

12 Claims, 17 Drawing Sheets

FIG. 18A        Prior Art
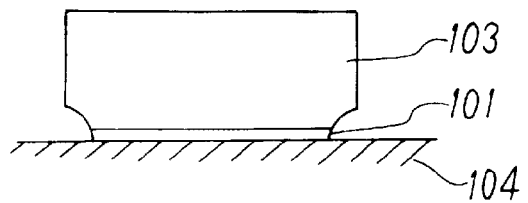
FIG. 18B        Prior Art
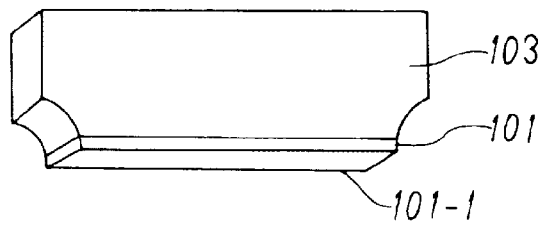
FIG. 18C        Prior Art
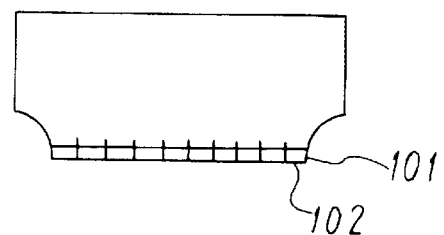
FIG. 18D        Prior Art
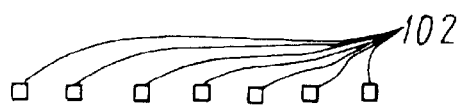

LAPPING APPARATUS AND LAPPING METHOD

BACKGROUND OF THE INVENTION

1. Field of the Invention

The present invention relates generally to a lapping method and a lapping apparatus for compensating a warp of a work during a lapping process of the work, and more particularly to a lapping method and a lapping apparatus for consecutively compensating the warp of the work while automatically lapping the work.

2. Related Background Art

A magnetic thin film head has hitherto been lapped after forming the magnetic thin film head in, e.g., a process of manufacturing the magnetic head. In this lapping process, heights of a gap and of a magnetic resistance layer of the magnetic thin film head are uniformly lapped.

An accuracy as hyperfine as sub-micron is required of the heights of the gap and of the magnetic resistance layer. The lapping apparatus is therefore required to automatically lap the work at a high accuracy.

FIGS. 17A~17B and 18A~18D are explanatory views showing a process of manufacturing a composite type magnetic head.

As illustrated in FIG. 17A, rows 101 of a multiplicity of composite type magnetic heads are formed on a wafer 100 by a thin film technology. The composite type magnetic head 101 is composed of a magnetic resistance element and an inductive writing element which are provided on a substrate.

Next, as shown in FIG. 17B, the wafer 100 is cut in strips, thereby forming a row-bar 101. This row-bar 101 is constructed of one row of magnetic heads 102. Further, resistance elements (ELG elements) 102a for a lapping monitor are provided at a left end, a center and a right end of the row-bar 101.

In the magnetic head 102, it is required that a resistance value of a magnetic resistance film of each magnetic head be adjusted to a fixed value. Therefore, a height of the magnetic resistance film is lapped to a fixed value. The row-bar 101 is, however, extremely thin, and a thickness thereof is on the order of, e.g., 0.3 millimeter. Accordingly, it is difficult to directly fit the row-bar to a lap jig. Hence, as shown in FIG. 17C, the row-bar 101 is bonded to a transfer tool 103 by use of a thermal fusion wax.

Then, as shown in FIG. 18A, the row-bar 101 is placed on a lap plate 104 and lapped. At this time, as known from Japanese Patent Application Laid-Open Publication No.2-124262 (U.S. Pat. No. 5,023,991) and Japanese Patent Application Laid-Open Publication No.10-286765, a resistance value of the ELG element 102a of the row-bar 101 is measured throughout the lapping process. Then, the measured resistance value is converted into a height of the magnetic resistance film of the magnetic head 102, and it is detected whether or not the height reaches a target height.

When it is detected through the measurement of the resistance value that the magnetic resistance film is lapped to the target height, the lapping process is terminated. Thereafter, as shown in FIG. 18B, a slider is formed on a lower surface 101-1 of the row-bar 101.

Further, as shown in FIG. 18C, with the transfer tool 103 remaining fitted, the row-bar 101 is cut into each magnetic head 102. Then, as illustrated in FIG. 18D, each magnetic head 102 is taken out while fusing the thermal fusion wax by heating the transfer tool 103.

The row-bar 101 constructed of one row of magnetic heads 102 is formed, and thereafter the lapping process is executed on the unit of the row-bar 101, whereby the magnetic resistance films of the multiplicity of magnetic heads 102 can be lapped at one time.

FIGS. 19A and 19B are explanatory views showing the prior art.

As shown in FIG. 19A, the row-bar 101 is 0.34 mm thick and 1.2 mm wide. As compared with these dimensions, its length is as long as 40.7 mm, and therefore a warp (bend) is easy to occur in a longitudinal direction. So, it is difficult to ensure straightness which is as precise as sub-microns. Namely, there might be an error in a bonding accuracy in a bonding process of bonding the row-bar 101 to the dedicated transfer tool 103. Further, there is also a limit in terms of a bonding surface accuracy of the transfer tool 103. This might become hindrance against uniformization of lapping accuracy especially of the magnetic resistance element.

Such being the case, the following warp compensating method is proposed in the specification of Japanese Patent Application Laid-Open Publication No.10-286765. As shown in FIG. 19B, the warp compensating involves applying a bend pressure to the central position of the transfer tool 103, and making the transfer tool 103 deformed. Therefore, a bending mechanism for applying the bend pressure is provided in the central position of the transfer tool 103.

Then, a warp quantity of the row-bar 101 attached to the transfer tool 103 is detected by an optical method etc. before the lapping process. Subsequently, the bending mechanism bends the transfer tool 103 so that the detected warp quantity comes to zero during the lapping process. This bending mechanism involves the use of a mechanism for converting a quantity of rotation into displacement by utilizing a screw.

There arise, however, the following problems inherent in the prior art.

First, the transfer tool 103 is formed with a hole for fitting to the lap jig. Therefore, when a lapping pressure is applied to the transfer tool, a warp occurs due to the tool hole. That is, when the lapping pressure is applied, a large pressure is generated at both side ends of the row-bar 101, resulting in a difficulty of lapping the central portion of the row-bar 101. If the lapping continues as it is, the lapping pressure of the row-bar becomes constant, and the work is lapped with the warp remaining occurred. The prior art has such a problem that the warp occurred during the lapping process can not be compensated because of using the warp quantity measured beforehand. Further, there is needed a labor for measuring the warp quantity beforehand.

Second, the bending mechanism involves the screw mechanism in the prior art. Therefore, a problem is that it is difficult to compensate a minute quantity of warp. Moreover, when giving a force for rotating the screw, the lap jig for holding the transfer tool rotates. Because of being incapable of controlling this, the lapping accuracy declines. Further, an excessive pressure is applied to the lap jig, and consequently a smooth lapping process is hard to attain.

SUMMARY OF THE INVENTION

It is a primary object of the present invention to provide a lapping method and a lapping apparatus capable of compensating a warp of a work occurred during a lapping process.

It is another object of the present invention to provide a lapping method and a lapping apparatus capable of compensating a minute quantity of warp of a work.

It is a further object of the present invention to provide a lapping method and a lapping apparatus capable of preventing an excessive pressure from being applied to a lap jig even when applying a pressure for compensating the warp.

To accomplish the above objects, according to a first aspect of the present invention, a lapping method comprises a step of detecting a warp quantity of the work during a lapping process, and a step of controlling a force of pressurization to be applied to the work so that the detected warp quantity becomes a target value.

According to the present invention, first, the warp quantity of the work is compensated by detecting the warp quantity of the work during a lapping process. It is therefore feasible to compensate the warp occurred during the lapping process. Further, before the lapping process, a labor for measuring the warp quantity of the work can be saved.

According to a second aspect of the present invention, the controlling step comprises a step of controlling a fluid pressure of bending means for applying a pressure to the work.

The bending means involves the use of a mechanism for applying the pressure to the work in accordance with a fluid pressure. The minute quantity of warp can be thereby compensated, and the warp quantity can be controlled down to zero. Moreover, because of pressurizing with the fluid, it is possible to prevent the excessive pressure from being applied to the lap jig. Herein, the fluid includes a gas and a liquid.

According to a third aspect of the present invention, the controlling step includes a step of changing a bend cycle in accordance with a difference between the detected warp quantity and the target value. A warp compensation interval is changed corresponding to an error, thereby properly executing the warp compensation.

According to a fourth aspect of the present invention, the controlling step includes a step of controlling the force of pressurization so that the warp quantity to be compensated at the bend cycle becomes a fixed value. The warp compensation quantity is fixed, and hence the proper control can be done corresponding to a grinding speed.

According to a fifth aspect of the present invention, the controlling step includes a step of changing the target value in accordance with a lapping pressure upon the work. The warp target value is changed in accordance with the lapping pressure upon the work, whereby the warp quantity changing depending on the lapping pressure can be properly approximated to zero.

According to a sixth aspect of the present invention, the step of detecting a warp quantity of the work includes a step of detecting heights of measurement elements provided in both of side end positions and a central position of the work, and a step of calculating the warp quantity by subtracting an average value of the heights of the measurement elements provided in the positions of the two side ends, from the height of the measurement element provided in the central position of the work.

The measurement elements are provided at the positions at the two side ends and the central position of the work, the warp quantity of the work is thus detected, whereby the warp quantity of the work can be precisely detected in real time.

According to a seventh aspect of the present invention, a lapping apparatus comprises bending unit for applying a pressure force to the work, and a control unit for detecting a warp quantity of the work and controlling the pressure force of the bending unit so that the detected warp quantity becomes a target value.

According to an eighth aspect of the present invention, the bending unit includes a cylinder, provided in a lap jig for holding the work, for applying a pressure to the work, and a supplying unit for supplying a fluid into the cylinder. The cylinder is provided in the work, and the apparatus can be constructed in a compact configuration.

According to a ninth aspect of the present invention, the supplying unit includes a cylinder rod taking a hollowed structure and provided at a central cylinder for applying a lapping pressure to the work in a central position of the work, and a fluid supplying unit for supplying a fluid to the cylinder rod. The lap jig is formed with a hole for leading the fluid of the cylinder rod to the cylinder.

A passageway for supplying the fluid of the cylinder of the lap jig is provided in the central cylinder for applying the lapping pressure to the work in the central position of the work, so that even when the central cylinder is provided, the pressure for straightening the warp can be applied in the compact configuration.

According to a tenth aspect of the present invention, an O-ring is provided at the tip of the cylinder rod. Even when the central cylinder is provided with the cylinder rod, the connection to the cylinder of the lap jig can be easily made and ensured.

According to an eleventh aspect of the present invention, the O-ring has an inside diameter larger than the hole of the lap jig. Namely, the lapping pressure of the central pressurization cylinder decreases, and a reactive force generated at the connecting portion acts to push upward the cylinder rod of the central cylinder. Therefore, there might be a possibility in which the fluid supplied through the hollowed cylinder rod leaks out. Then, the inside diameter of the O-ring is set to $\phi 2$ so that the fluid never leaks out even if a pressure of the fluid supplied through the hollowed cylinder rod is maximized. Further, the hole of the lap jig is set to $\phi 1$ so that the fluid is surely supplied to the lap jig. This is because there must be a backlash between the lap jig and a lap base.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIGS. 18A, 18B, 18C and 18D are explanatory views (part 2) showing the process of manufacturing the magnetic head.

DESCRIPTION OF THE PREFERRED EMBODIMENTS

Figure 1:
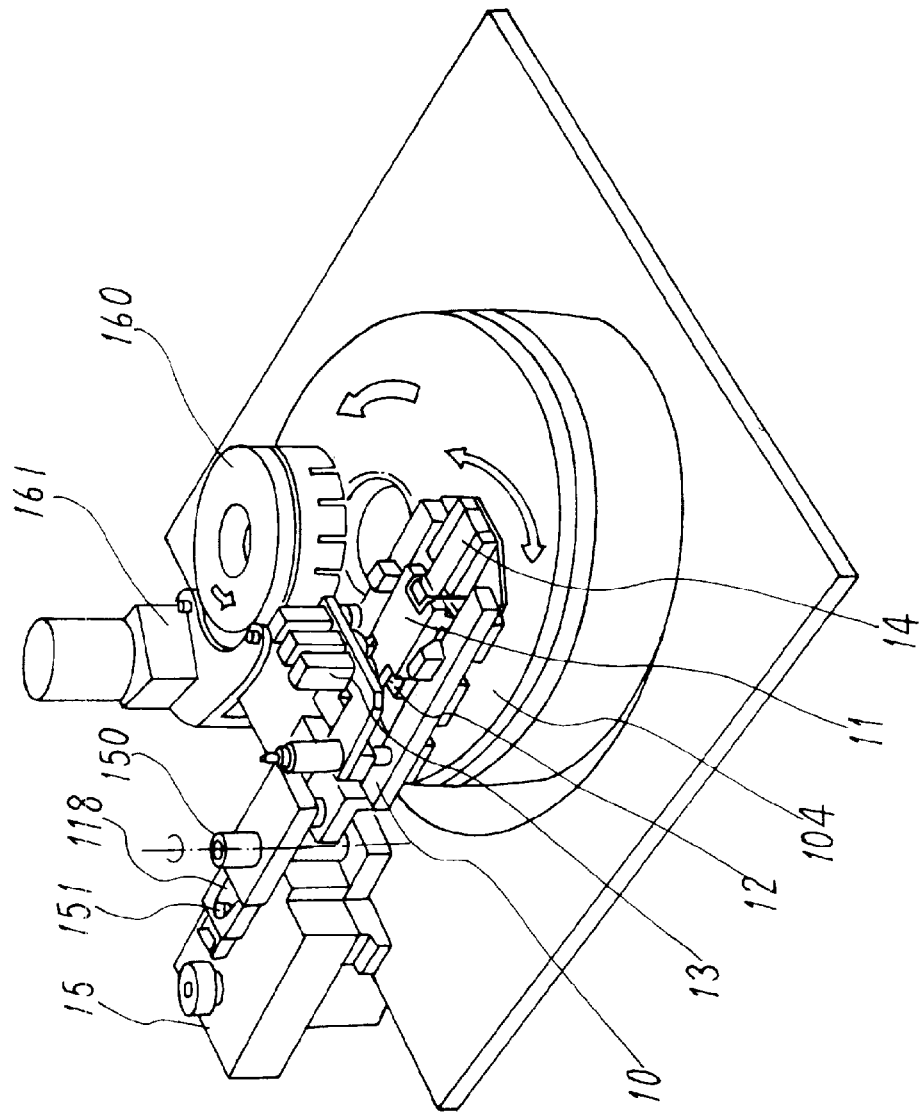
FIG. 1 is a perspective view showing a lapping apparatus in one embodiment of the present invention.
Figure 2:
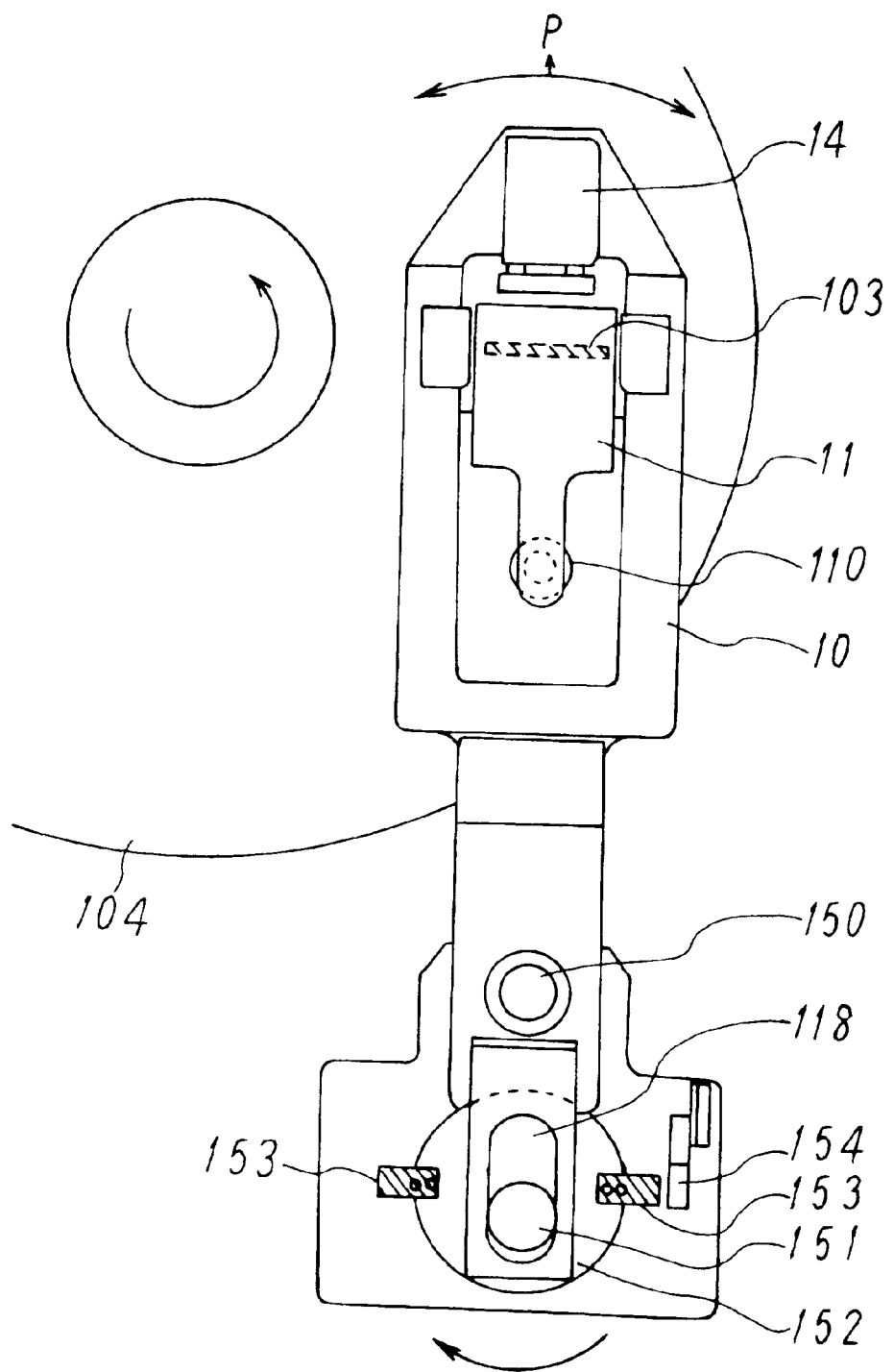
FIG. 2 is a top view of the lapping apparatus in FIG. 1.
Figure 3:
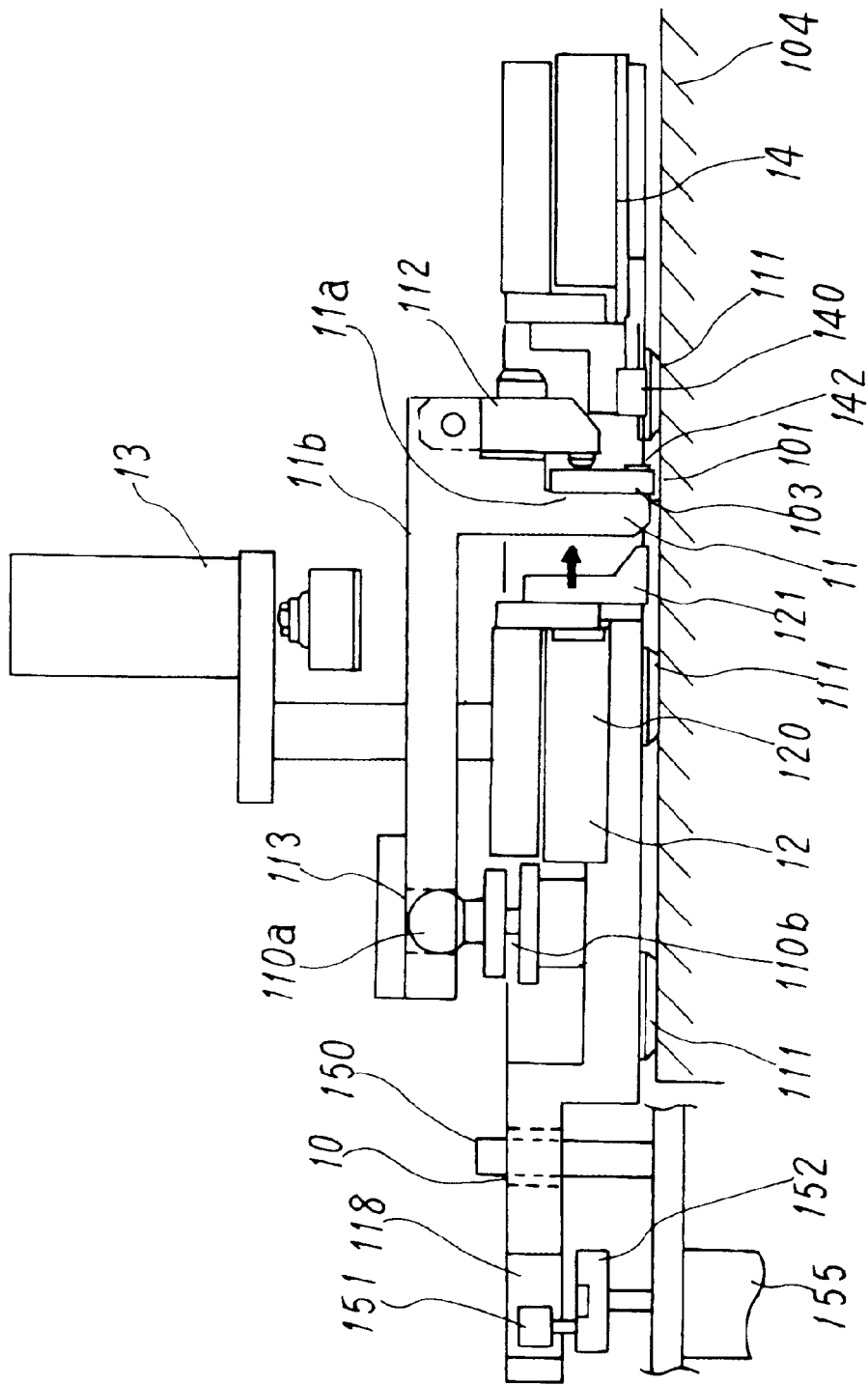
FIG. 3 is a side view of the lapping apparatus in FIG. 1.

FIG. 1 is a perspective view showing a lapping apparatus in one embodiment of the present invention. FIG. 2 is a top view of the lapping apparatus in one embodiment of the present invention. FIG. 3 is a side view of a lapping mechanism in FIG. 1.

As illustrated in FIGS. 1, 2 and 3, a lapping plate 104 is rotated by an unillustrated motor. A lap base 10 has six pieces of seat surfaces 11 formed on the underside thereof. The lap base 10 is set to a rotary shaft 150 fixed to the apparatus, and is rotatable about the rotary shaft 150. A distal end of the lap base 10 is formed with a cam hole 118.

An oscillation mechanism 15 oscillates the lap base 10. The oscillation mechanism 15 includes, as shown in FIGS. 2 and 3, an oscillation motor 155, a cam pulley 152 rotated by the oscillation motor 155, and an oscillation cam 151 provided on the cam pulley 152. The oscillation cam 151 engages with the cam hole 118 of the lap base 10.

Accordingly, as illustrated in FIG. 2, with rotations of the oscillation motor 155, the lap base 10 oscillates in an arrow direction in the Figure. The cam pulley 152 is provided with two pieces of sensor actuators 153. A sensor 154 detects the sensor actuator 153. A position of the sensor actuator 153 is so set as to be detected by the sensor 154 when the lap base 10 is positioned at a point P (a central point of oscillations) in FIG. 2.

Referring back to FIG. 1, the lap base 10 is provided with a pressurization mechanism 13 which will be explained later on. The pressurization mechanism 13 pressurizes an adapter 11. The adapter (a lap jig) 11 is set in the lap base 10. The adapter 11 takes substantially an L-shape as shown in FIG. 3. A work 103 (101) is provided on a first surface 11a of the adapter 11. The work 103 is fixed to the first surface 11a by a work fixing jig 112.

The adapter 11 has a second surface 11b. A side end of the second surface 11b is provided with a receptacle 113. A support mechanism 110 provided on the lap base 10 a has a height adjusting screw 10b and a spherical support member 10a. The receptacle 113 of the adapter 11 engages with the support member 110a.

Accordingly, the adapter 11 is supported pointwise by the lap base 10, and comes into contact with the lap plate 104 through a lapping surface of the work 103. More specifically, the adapter 11 is supported at three points, i.e., two points of the work 103 plus one point of the support mechanism 110.

Therefore, the work 103 is capable rotating about the support mechanism 110. The work 103 is thereby capable of following up the lap plate 104 independently of the lap base 10.

Therefore, the work 103 is lapped based on the lap plate 104 irrespective of an accuracy of the lap base 10. The work can be thereby lapped uniformly.

Referring back to FIG. 1, an unload mechanism 12 is provided on the lap base 10. The unload mechanism 12, is illustrated in FIG. 3, pushes the adapter 11. The adapter 11 is thereby rotated about the support member 110a, and the work 103 is moved off the lap plate 104. The unload mechanism 12 includes an unload block 121 and an unload cylinder 120.

An unload operation thereof will be explained. When a resistance value of a lapping monitor resistance of a row-bar 101 comes to a predetermined value, it is required that the lapping be terminated. The lapping is halted by stopping the lap plate 104. The lap plate 104, however, upon receiving a stop command, stops after being decelerated. Therefore, it follows that the work 103 is to be lapped in a time till the lap plate is halted, and thereby, errors of dimensional accuracy of the work are occurred. Further, a mark of the plate might be put on the work 103.

Hence, when the resistance value of the lapping monitor becomes the predetermined value, the unload cylinder 120 is operated to protrude an unload block 121. With this operation, The adapter 11 is rotated about the support member 110a, thus moving the work 103 off the lap plate 104. Just when the resistance value of the lapping monitor becomes the predetermined value, the lapping is thereby immediately halted. The dimensional accuracy of the work is thereby enhanced. Further, since the adapter 11 is provided, this facilitates the unloading process.

Moreover, as shown in FIG. 2, the sensor 154 detects the actuator 153, and, when detecting that the lap base 10 is positioned at the point P (the central point of oscillations), the unload operation is carried out. The reason for this is that if the oscillation mechanism stops in a random position, the mark of the plate might be put on the work depending on the stop position.

In positions of a fringe of oscillations at both side ends thereof, an oscillation velocity is low, and the plate mark is easily put on the work. By contrast, in the central position P of the oscillations, the oscillation velocity is highest, and it is hard that the plate mark is put on the work. Then, the sensor 154 detects that the lap base 10 arrives at the central position P of the oscillations by detecting the actuator 153, the work unload operation described above is performed. With this operation, when halted, the plate mark is prevented from being put on the work.

A probe mechanism 14 is provided at a distal end of the lap base 10. The probe mechanism 14, as illustrated in FIG. 3, comes into electric contact with a resistance element of a lapping-oriented monitor of the row-bar 101 which is attached to the work 103. The probe mechanism 14 has a probe 140 coming into electric contact with the resistance element of the lapping-oriented monitor.

Referring back to FIG. 1, an adjusting ring 160 is rotated by a adjusting ring rotating mechanism 161. The adjusting ring 160 smoothly spreads a slurry liquid (a polishing liquid) over the lap plate 104. Further, the adjusting ring 160 adjusts the lap plate 104 in a plane state.

Figure 4:
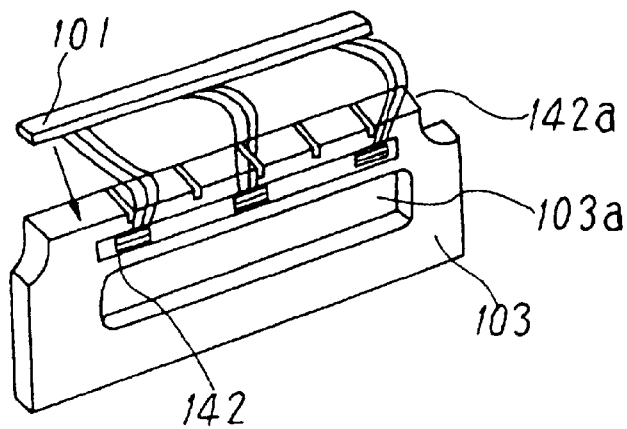
FIG. 4 is an explanatory view of a work in FIG. 2.
Figure 5:
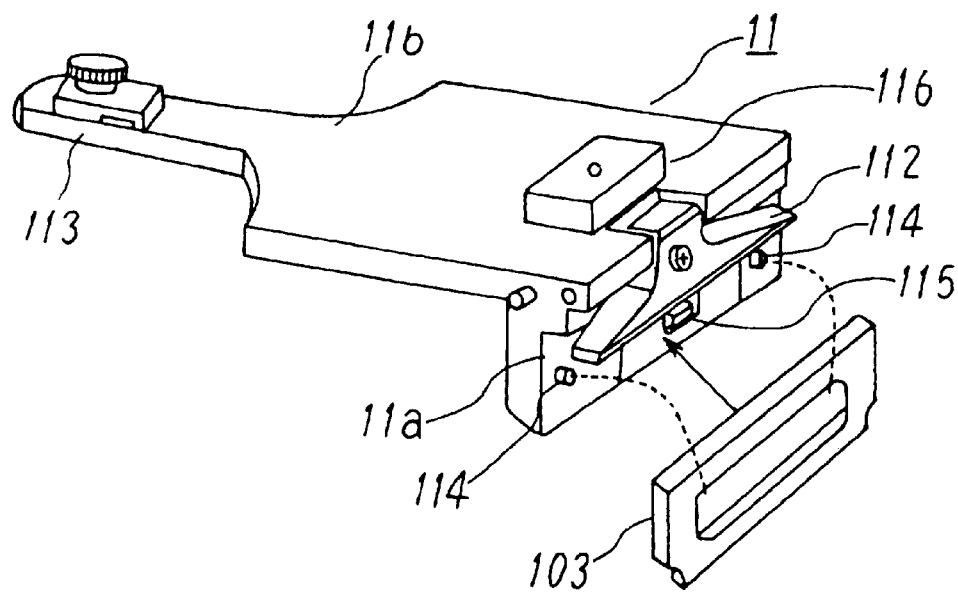
FIG. 5 is an explanatory view of an adapter in FIG. 2; work.
Figure 6:
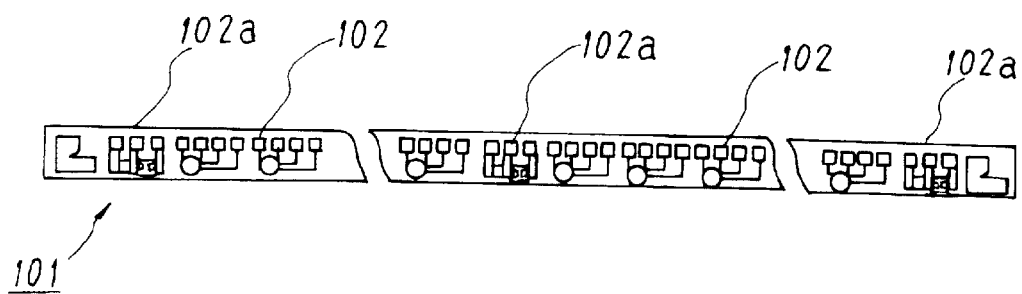
FIG. 6 is an explanatory view of a row-bar in FIG. 4.
Figure 7:
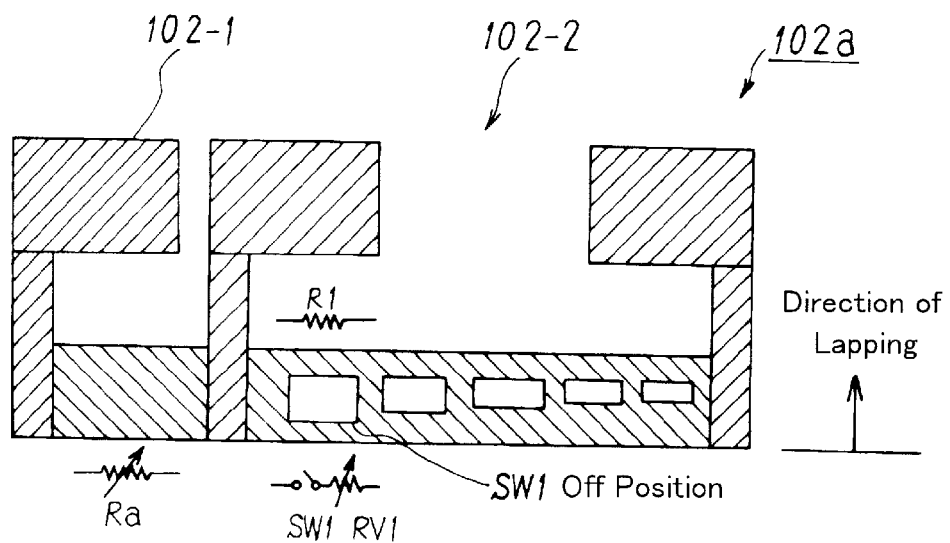
FIG. 7 is an explanatory view of an ELG element in FIG. 6.

FIG. 4 is an explanatory view of the work. FIG. 5 is an explanatory view of the adapter. FIG. 6 is an explanatory view of the rover. FIG. 7 is an explanatory view of the ELG element.

As shown in FIG. 4, the transfer tool (work) 103 has a fitting hole 103a. The row-bar 101 is bonded to the work 103. The work 103 is provided with a relay printed board 142. The relay printed board 142 has a large terminal. Then, a terminal of the lapping monitor oriented resistance element (called the ELG element) of the row-bar 101, which will be explained later on, is connected to the terminal of the relay printed board 142 via bonding wires 142a.

The terminal of the ELG element of the row-bar 101 is small. Besides, this terminal is covered with the polishing liquid, and, even when the probe 140 is brought into direct contact with the terminal, a resistance of the ELG element is unable to be measured with a stability. Therefore, a contrivance is that the probe 140 comes into contact with the relay printed board 142. The replay printed board 142 can be provided in a position apart from the lapping surface and provided with a large terminal, and hence the stable measurement of the resistance can be implemented.

As shown in FIG. 5, the work 103 is fitted to the adapter (the lap jig) 11. The adapter 11 includes a protruded member 114 engaging with the hole 103a of the work 103 and thus supporting the work 103, and a work fixing block 112. The work 103 is positioned by the protruded member 114, and held by the first surface 11a and the fixing block 112 while being sandwiched in therebetween. Note that the numerals 115, 116 designate bend mechanisms which will be mentioned later on referring to FIG. 8.

As illustrated in FIG. 6, the row-bar 101 includes magnetic head elements 102 and ELG elements 102a. The ELG elements 102a are provided at three portions, i.e., a left side end, a center and a right side end of the row-bar As shown in FIG. 7, the ELG element 102a is composed of an analog resistance 102-1 and a digital resistance 102-2. The analog resistance 102-1 has such a pattern that a resistance value rises as a resistance film is reduced. The digital resistance 102-2 has such a pattern as to be switched OFF when the resistance film is reduced down to a fixed value.

Accordingly, the analog resistance 102-1 is indicated by a variable resistance. Then, as a height of the ELG element decreases, the resistance value rises. The digital resistance 102-2 is indicated by five pieces of switch resistances. Then, the digital resistance 102-2 exhibits a change in polygonal line in an OFF-position of the resistance.

The resistance value of the ELG element indicates a height of the ELG element. A relationship between an analog resistance value Ra of the ELG element and a height h of the ELG element, can be approximated by the following formula:

$$Ra = a/h + b \quad (1)$$

Where a and b are the coefficients which can be empirically obtained beforehand. This characteristic, however, changes depending on a process condition etc of each wafer 100. The digital resistance 102-2 is provided for compensating this. OFF-positions h1–h5 of the digital resistance 102-2 are previously known. When the OFF-state of the digital resistance 102-2 is detected, and a measured resistance value of the analog resistance 102-1 and the OFF-position at this time are substituted into the formula (1). Given that 2 OFF-state positions of the digital resistance 102-2 are obtained, the coefficients a and b in the formula (1) are to be acquired.

Based on this formula, the analog resistance value Ra of the ELG element is converted into the height h of the ELG element. With this conversion, the resistance value of the ELG element is measured, thereby obtaining the height of the ELG element. It can be therefore judged whether or not the height of the ELG element reaches a target value. As will hereinafter be explained, when the height of the ELG element reaches the target value, the lapping halts.

Figure 8:
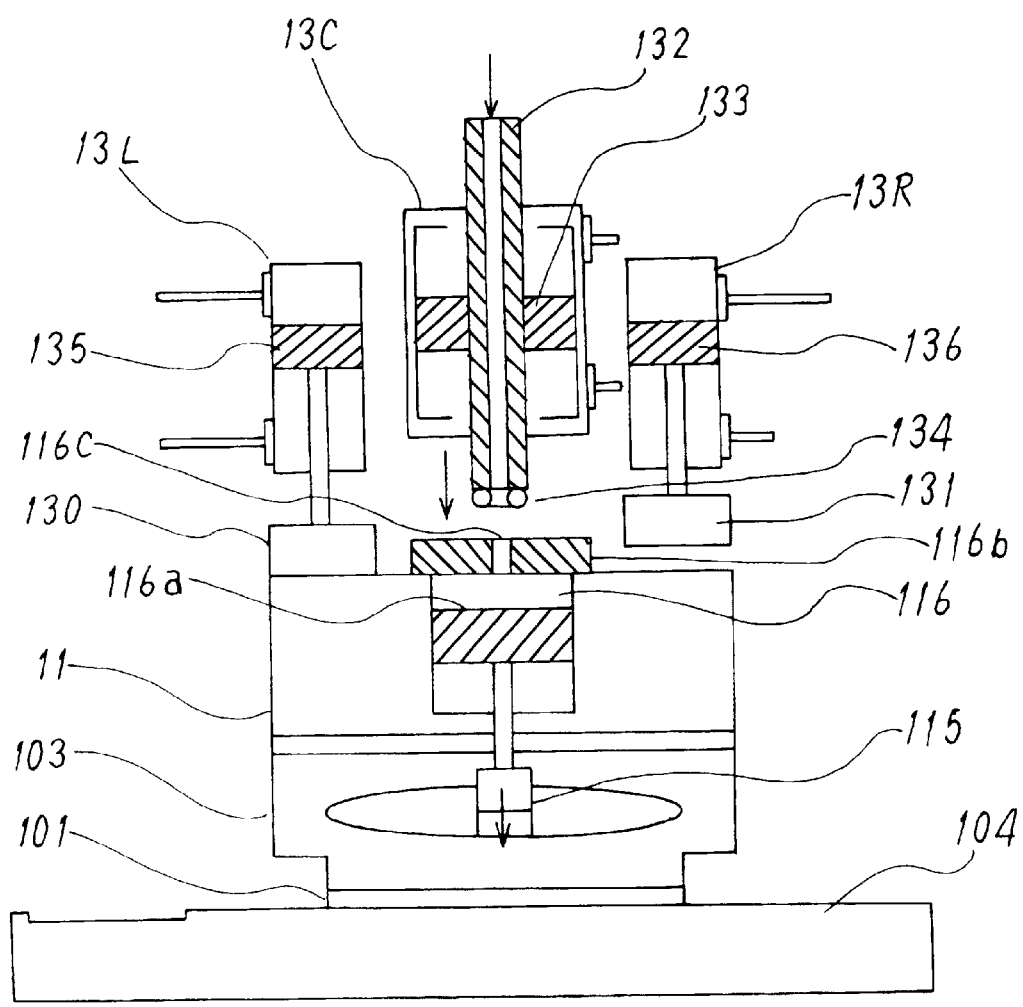
FIG. 8 is a sectional view of the lapping apparatus in FIG. 1.
Figure 9:
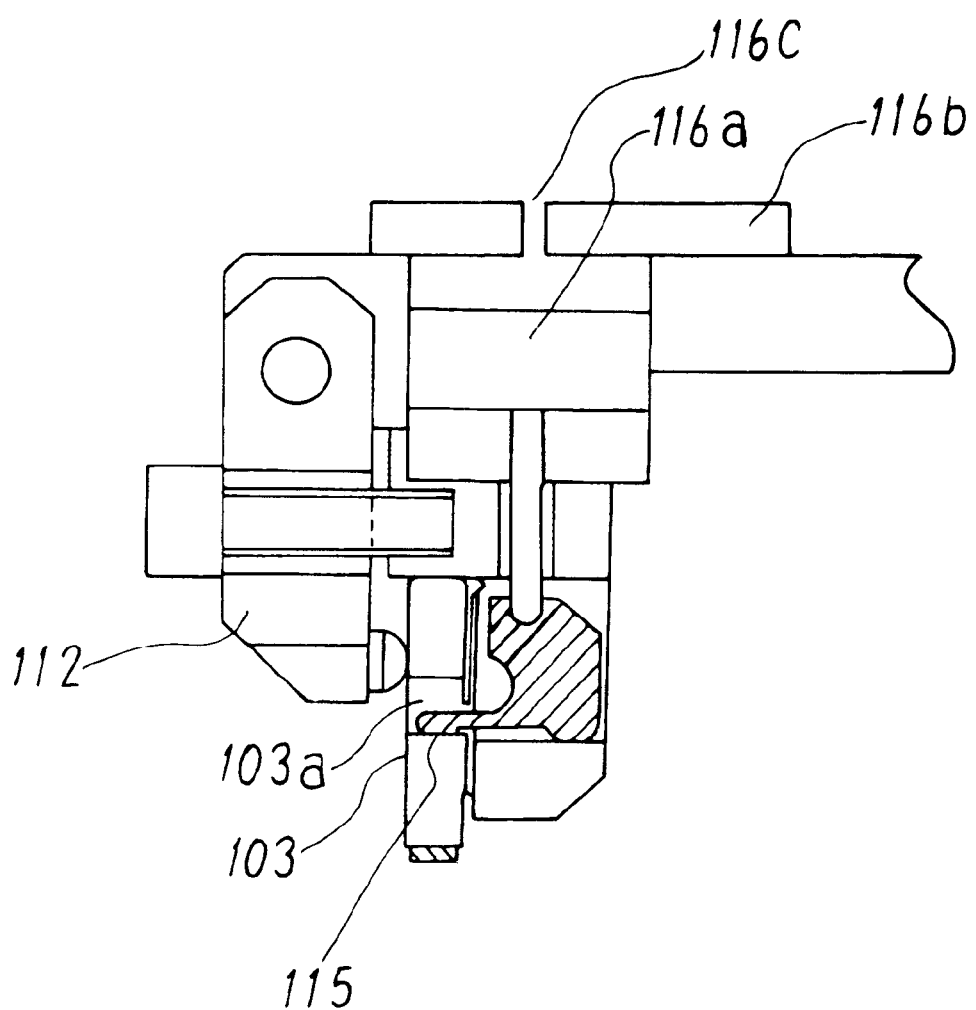
FIG. 9 is a sectional view of a bend mechanism in FIG. 8.
Figure 10:
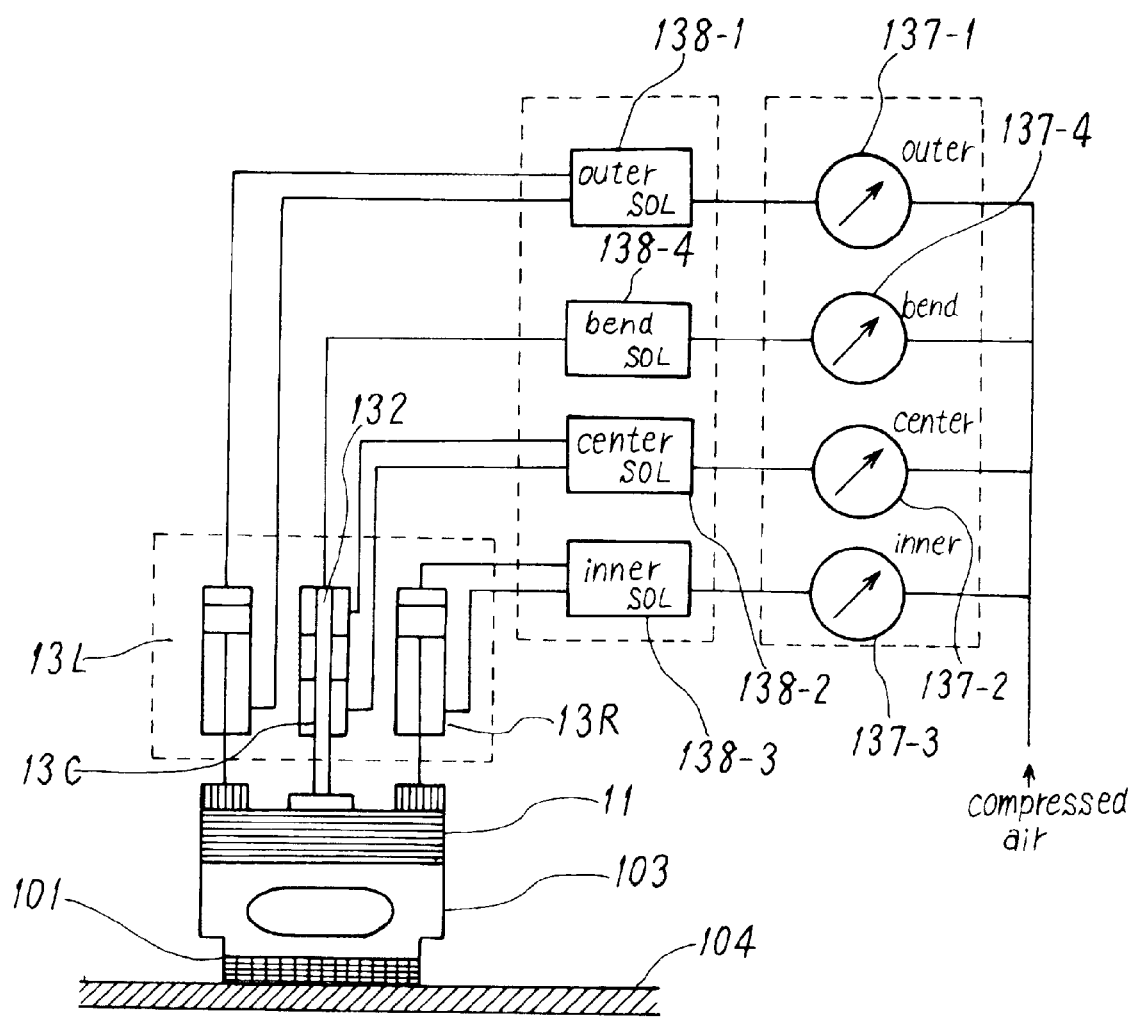
FIG. 10 is a block diagram sowing a pressurization mechanism in FIG. 8.

FIG. 8 is a sectional view of the lapping apparatus in FIG. 1. FIG. 9 is a sectional view of the bend mechanism in FIG. 8. FIG. 10 is a block diagram showing the pressurization mechanism.

As illustrated in FIG. 8, the pressurization mechanism 13 has three pressurization cylinders 13L, 13C, 13R. The left side pressurization cylinder 13L pressurizes a left side of the adapter 11. The central pressurization cylinder 13C pressurizes a center of the adapter 11. The right side pressurization cylinder 13R pressurizes a right side of the adapter 11. Tips of the pressurization cylinders 13L, 13R are provided with pressurization blocks 130, 131. Further, the pressurization cylinders 13L, 13R have cylinders 135, 136, respectively.

Then, the central cylinder 13C includes a second cylinder rod 132 provided at the center of a first cylinder rod 133. The second cylinder rod 132 takes a hollowed structure. The air of which a pressure is controlled passes through the hollowed portion of the second cylinder rod 132. An O-ring 134 is provided at the tip of the second cylinder rod 132.

The adapter 11 is provided with the bend mechanism for correcting a warp of the row-bar 101. As shown in FIGS. 8 and 9, the bend mechanism includes a bend arm 115 and a bend cylinder 116. The bend arm 115 presses a wall of the fitting hole 103a of the work 103. The bend cylinder 116 includes a cylinder rod 116a connected to the bend arm 115. The bend cylinder 116 is provided with a presser block 116b. The presser block 116b is formed with a hole 116c for guiding the pressure-controlled air to the cylinder 116.

As illustrated in FIG. 8, a pressure of the first cylinder rod 133 of the central cylinder 13C is controlled, and the tip of the second cylinder rod 132 is connected to the hole 116c of the presser block 116b of the adapter 11. At this time, a lapping pressure in the central position of the adapter 11 is determined by the pressure of the first cylinder rod 133.

The pressure air introduced into the hollowed portion of the second cylinder rod 132 passes through the hollowed portion and is supplied via the hole 116c to the cylinder 116 of the adapter 11. By dint of this pressure, the cylinder 116 presses the bend arm 115 through the cylinder rod 116a. This bend arm 115 presses the central position of the lower wall of the fitting hole 103a of the work 103, whereby the work 103 is bent to correct the warp of the row-bar 101. A quantity of the correction is determined by a pressure of the pressure air.

A stroke of the cylinder 116 built in the adapter 11 is as small as 1 mm, however, a cylinder thrust can be arbitrarily changed by controlling a supply pressure. A resolution thereof is, if converted into a warp correction quantity, 0.01 μm or less.

Pressurization mechanism will be explained referring to FIG. 10. As shown in FIG. 10, the cylinders 13L, 13C, 13R are provided with electromagnetic valves 138-1, 138-2, 138-3, and regulators 137-1, 137-2, 137-3. Further, the second cylinder rod 132 of the central cylinder 13C is provided with an electromagnetic valve 138-4 and a regulator 137-4.

A supply pressure of the regulator 137-4 is controlled corresponding to a bend quantity (as described in step 24) required, whereby an arbitrary bend quantity can be obtained.

Further, the lap plate 104 rotates, and therefore its velocity is different in an inner-side position of the work 103 and in an outer-side position thereof. Namely, a velocity V0 in the outer-side position is higher than a velocity V1 in the inner-side position. Hence, a lapping speed on the outer side is higher than a lapping speed on the inner side.

For compensating this gap, the supply pressure of the outer cylinder 13L is changed to a supply pressure of the inner cylinder 13R. That is, the supply pressure of the outer cylinder 13L is set smaller than the supply pressure of the inner cylinder 13R. Therefore, a set pressure of the outer regulator 137-1 is set smaller than a set pressure of the inner regulator 137-3.

With this setting, an outer lapping pressure becomes smaller than an inner lapping pressure. Consequently, the lapping speed on outer side can be adjusted to the same as the lapping speed on the inner side.

As described above, the bend mechanism involves the use of the cylinder operated by the pressure air, and hence a minute bend quantity can be controlled. Therefore, the warp of the row-bar 101 can be reduced down to 0. Further, the cylinder 116 is incorporated into the lap jig (the adapter) 11, a compact structure can be attained.

Furthermore, the central cylinder 13C is constructed of the double rod, and the cylinder rod takes the hollowed structure, whereby the bend pressure air can be supplied even when providing the central cylinder for pressurizing the central position with the central cylinder 116 becoming no obstacle. The apparatus can be constructed in the compact configuration.

Besides, the O-ring 134 is used for facilitating and ensuring the connection between the cylinder rod 132 and the cylinder 116. An inside diameter of the O-ring is $2\phi$, a diameter of the rod hollowed portion is $1\phi$, and a connection aperture (hole) 116c is $1\phi$. Thus, the inside diameter of the O-ring 134 is set larger than the inside diameter of the rod hollowed portion and the aperture of the hole 116c.

The following is an elucidation of the reason for this. In an automatic lapping process, if a remaining lapping allowance decreases, the operation enters a finishing lapping process. At this stage, the thrust of the central cylinder 13c becomes smallest, thereby a reactive force generated in the central position of the work 103 acts to push upward the cylinder rod 132 of the central cylinder 13c, and there might be a possibility in which the air for bending leaks out. Such being the case, the inside diameter of the O-ring 134 is set to 2 $\phi$ so that the supply air for bending does not leak out of the connecting portion. Further, there is a backlash between the lap jig 11 and the lap base 10, and some allowance is given for ensuring the air connection.

Figure 11:
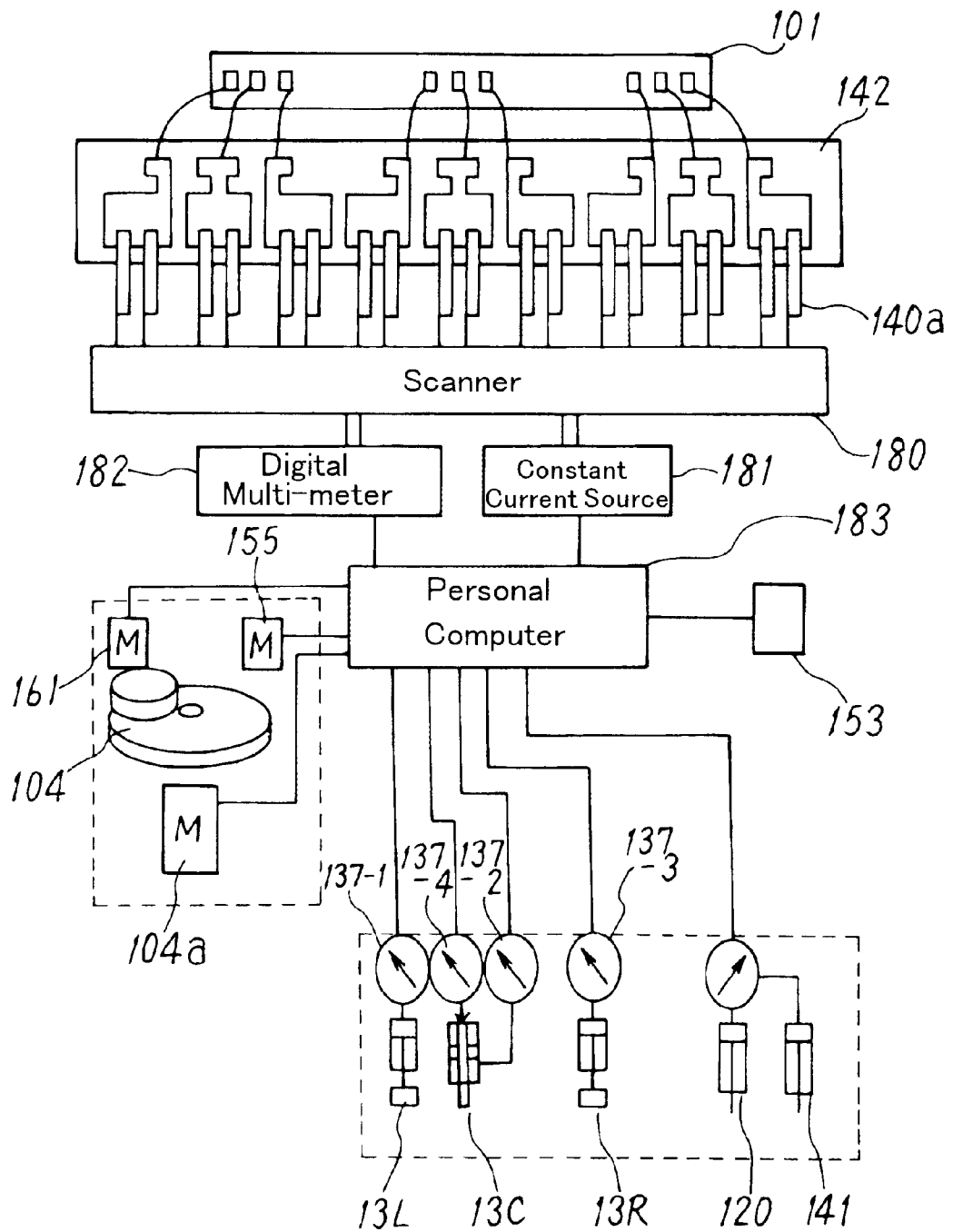
FIG. 11 is a block diagram showing one embodiment of the present invention.
Figure 12:
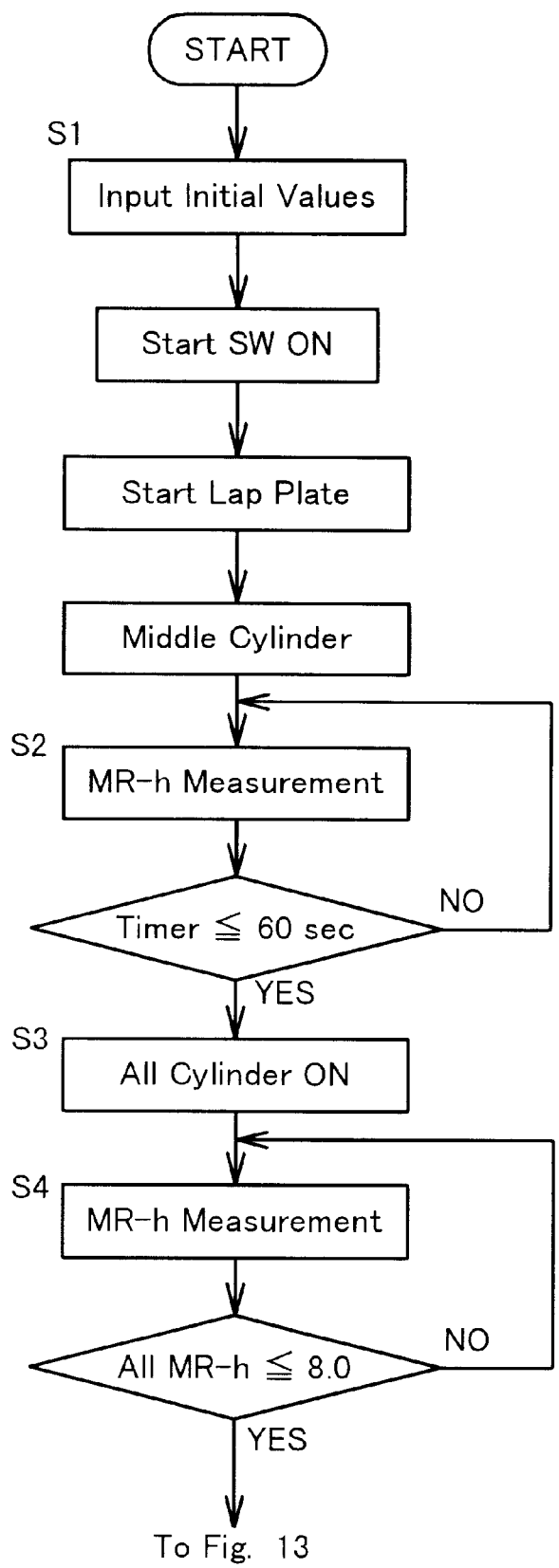
FIG. 12 is a flowchart (part 1) showing a lapping process in one embodiment of the present invention.
Figure 13:
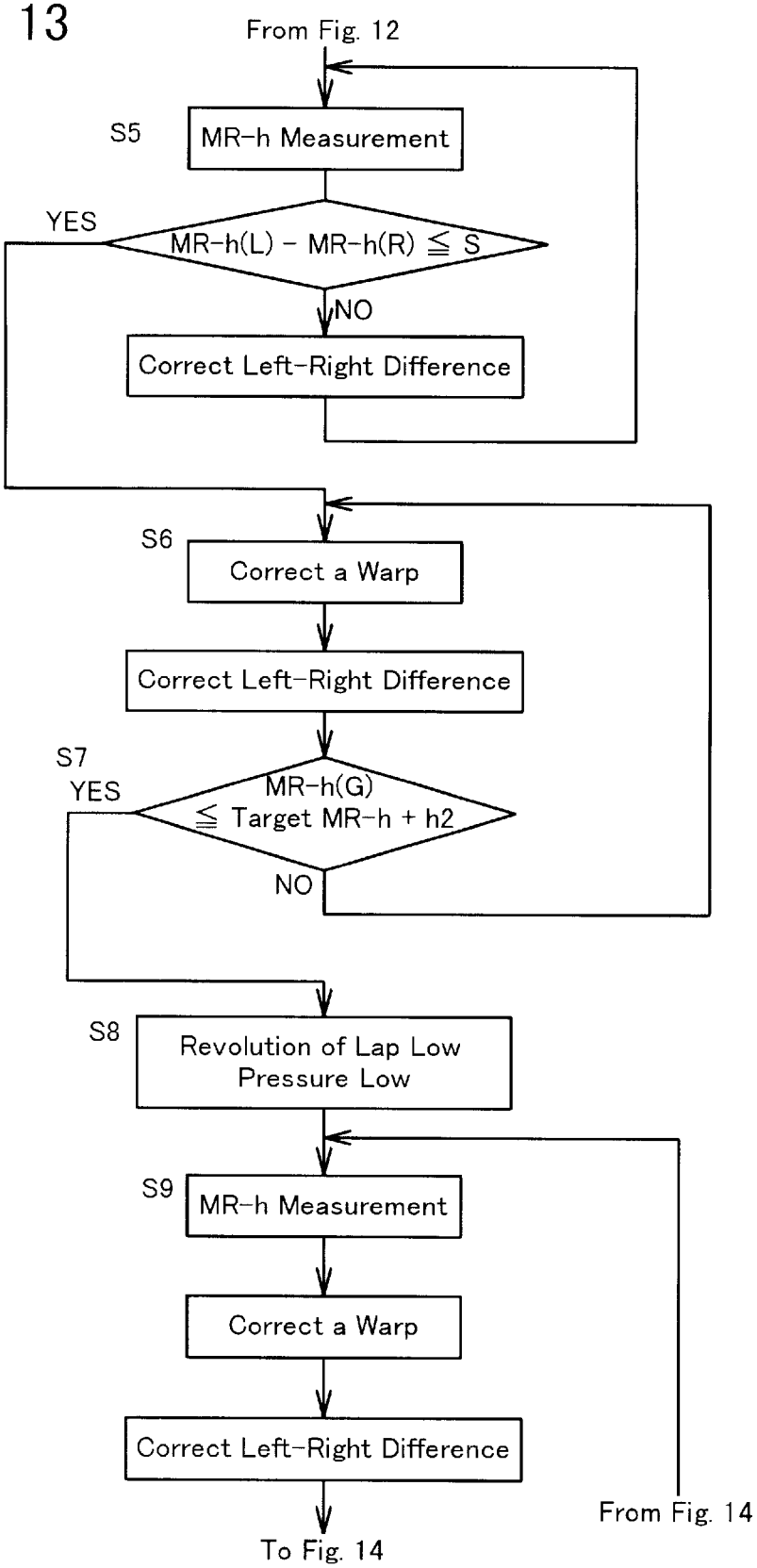
FIG. 13 is a flowchart (part 2) showing the lapping process in one embodiment of the present invention.
Figure 14:
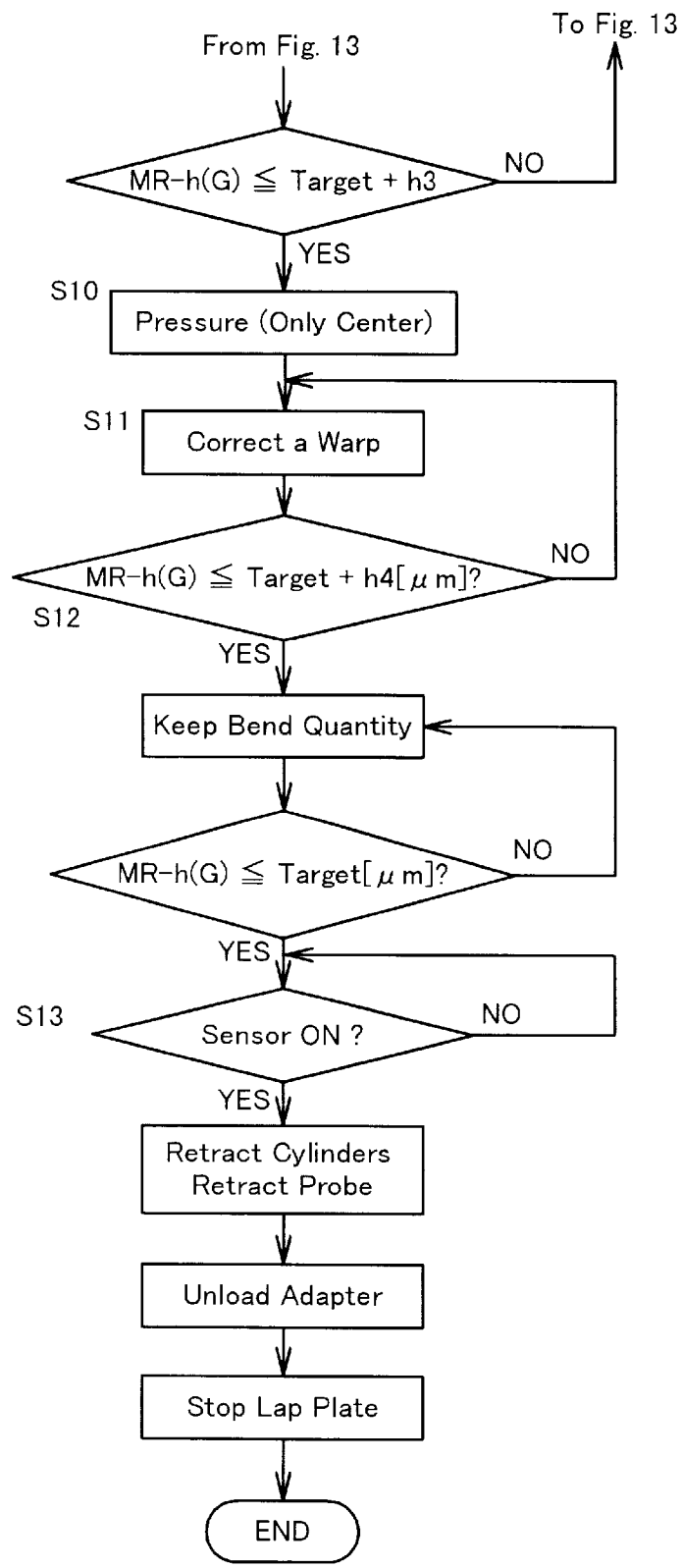
FIG. 14 is a flowchart (part 3) showing the lapping process in one embodiment of the present invention.
Figure 15:
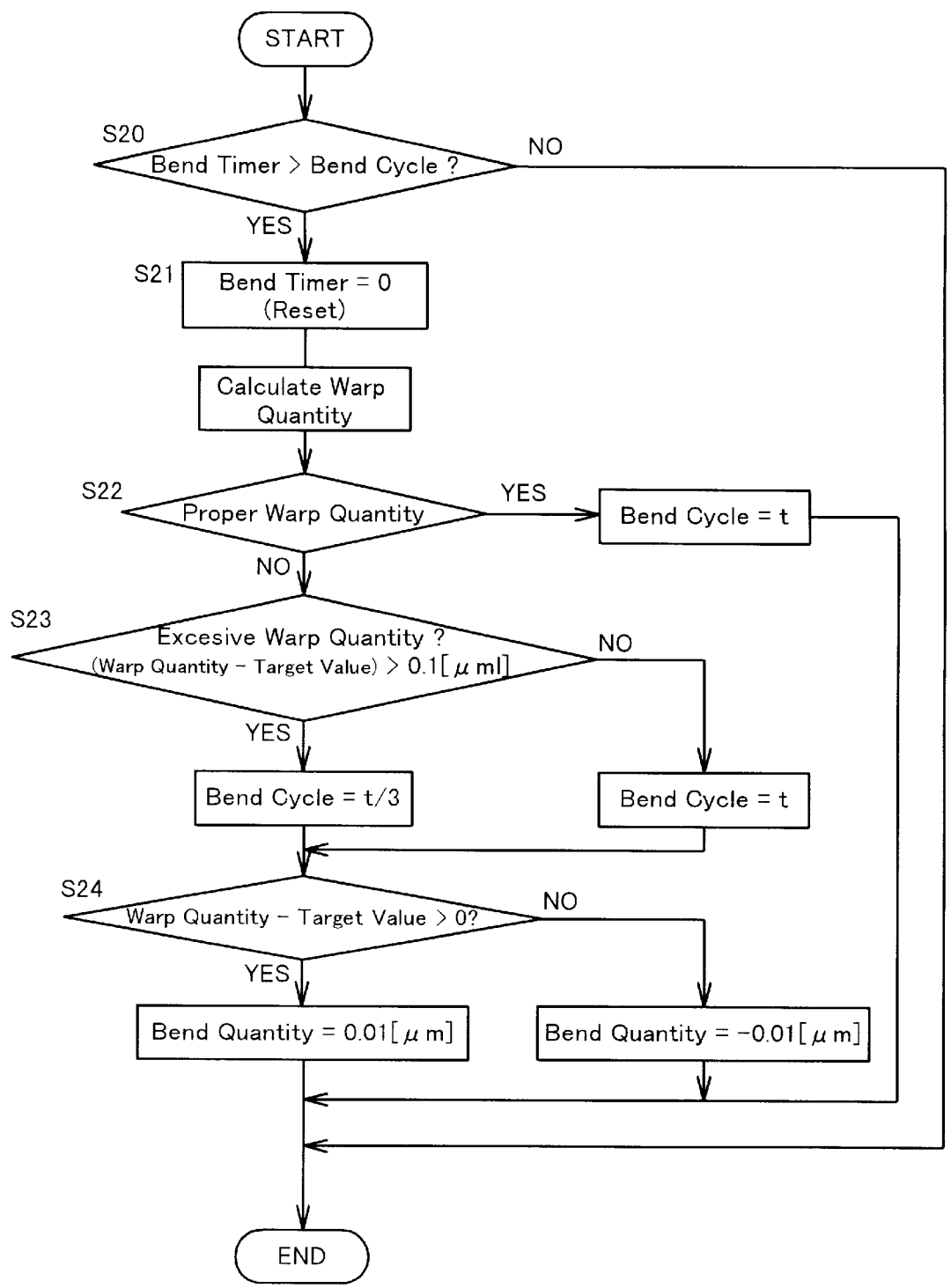
FIG. 15 is a flowchart showing a warp compensating process in FIGS. 12 to 14.
Figure 16:
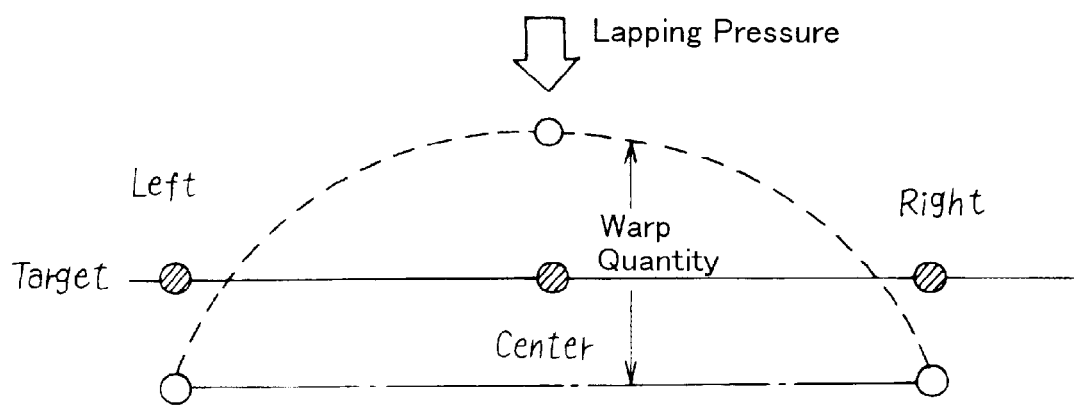
FIG. 16 is an explanatory view showing an operation of compensating the warp in FIG. 15.
Figure 17A:
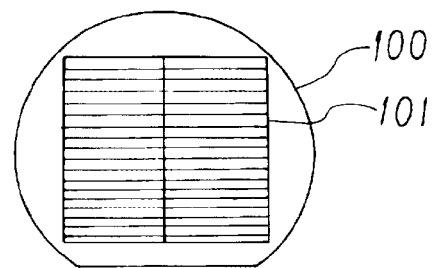
FIGS. 17A, 17B and 17C are explanatory views (part 1) showing a process of manufacturing a magnetic head.
Figure 17B:
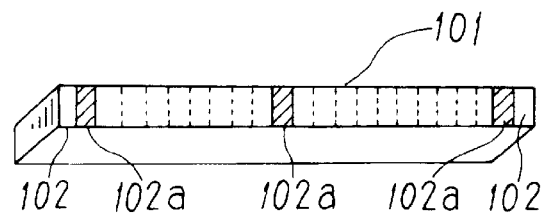
Figure 17C:
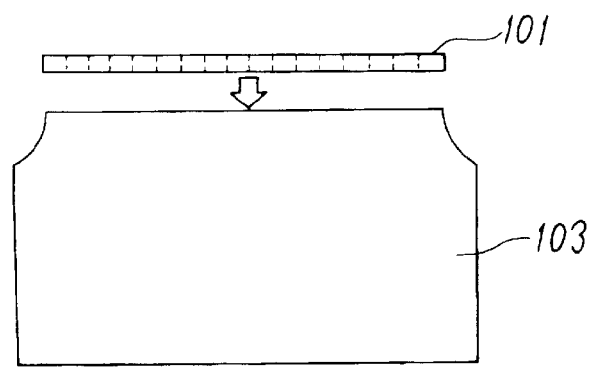
Figure 19A:
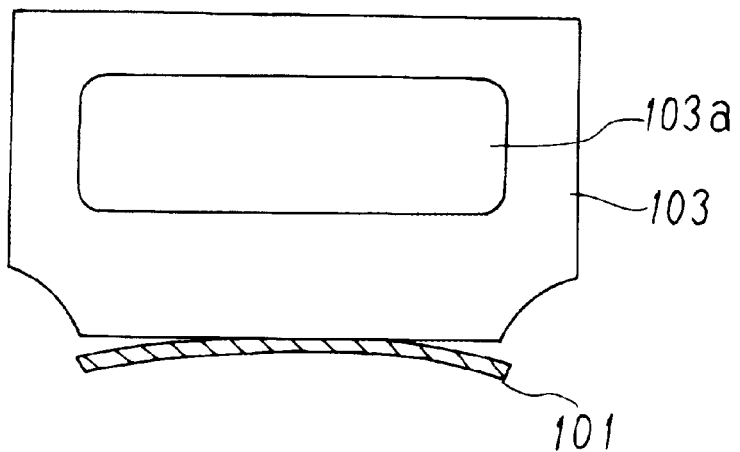
FIGS. 19A and 19B are explanatory views showing the prior art.
Figure 19B:
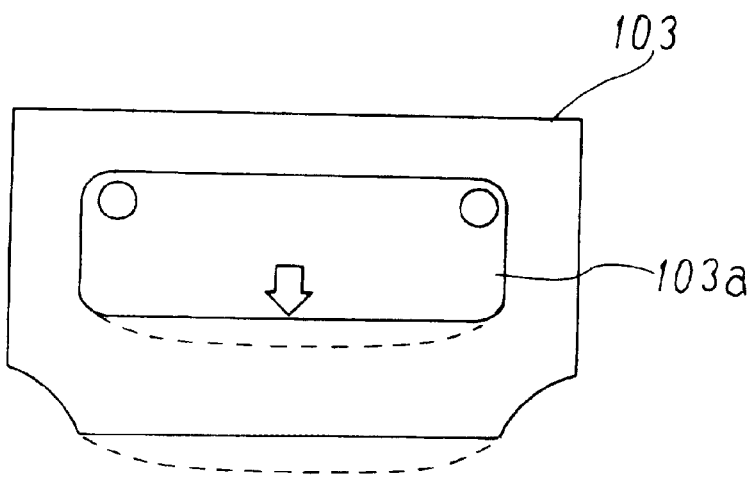

FIG. 11 is a block diagram showing one embodiment of the present invention. FIGS. 12 through 14 are flowcharts showing lapping process in one embodiment of the present invention. FIG. 15 is a flowchart showing a warp compensating process. FIG. 16 is an explanatory diagram of the warp compensating operation.

As shown in FIG. 11, a scanner 180 switches over a cannel of each probe 140a. A constant current source 181 supplies the electric current for measuring the resistance. A digital multimeter 182 measures a resistance value, based on an output from the scanner 180. A lap plate rotating motor 104a rotates the lap plate 104.

A personal computer (termed a control unit) 183 converts the measured resistance value given from the digital multimeter 182 into a height (designated by MR-h) of the ELG element, and thus controls the respective unit. Namely, the control unit 183 controls the oscillation motor 155 of the lap plate, the adjusting ring motor 161 and the rotating motor 104a. The control unit 183 also controls the regulators 137-1 through 137-4 of the cylinders 13L, 13C, 13R of the pressurization mechanism 13.

Further, the control unit 183 controls the cylinder 120 of the unload mechanism 12 and the cylinder 141 of the probe mechanism 14. Moreover, the control unit 183 receives the output of the oscillation sensor 153 of the oscillation mechanism, and controls the unload mechanism 12.

Hereinafter, the processes of the control unit will be explained referring to FIGS. 12 to 14.

(S1) To begin with, initial values are inputted by use of an input unit of the control unit 183. The initial values are a wafer number and a row-bar address etc. Thereafter, the operator sets the adapter 11 on the lap base 10. Then, the operator depresses a start switch. The control unit 183, upon detecting the depression of the start switch, actuates the lap plate. More specifically, the control unit 183 lets the lap plate 104 rotate at a high speed with revolutions of the motor 104a. The number of revolutions at this time is 50 rpm. The control unit 183 causes revolutions of the oscillation motor 155 to perform the oscillating operation. Further, the control unit 183 makes the adjusting ring motor 161 rotate. The control unit 183 starts supplying the slurry liquid.

Then, the control unit 183 turns ON the central cylinder 13C of the pressurization mechanism. The pressurization cylinder thereby performs flattening (stage 1) with one single light load. A burr of the row-bar 101 is removed off by this flattening.

(S2) The control unit 183 reads the resistance value of the ELG element from the digital multimeter 182, and measures the height MR-h of the ELG element. The control unit 183 operates a timer at a start of lapping and judges whether or not a timer value comes to 60 sec. If the timer value is within 60 sec, the height MR-h is measured. That is, the flattening process (stage 1) is executed for 60 sec. Then, in the meantime, as described above, the height MR-h is measured in order to detect a switch-OFF of the digital resistance.

(S3) The control unit 183, when the timer value indicates an elapse of 60 sec, finishes the flattening process (stage 1). Then, the control unit 183 turns ON all the cylinders 13L, 13C, 13R of the pressurization mechanism 13. That is, the load is made heavier, and a chamfering process (a stage 2) is carried out. With this chamfering process, a short-circuited state of the ELG element of the row-bar 101 is eliminated.

(S4) The control unit 183 reads the resistance value of the ELG element from the digital multimeter 182, and measures the height MR-h of the ELG element. The control unit 183 judges whether or not the heights MR-h of all the ELG elements positioned at the left end, the center and the right end, are under h1 (8.0 microns). If the heights MR-h of all the ELG elements are not under 8.0 microns, the height (MR-h) is to be measured. Hereinafter, the height MR-h is measured at an interval of a fixed period and thus updated.

In a flattering process anterior to this process, if a partially short-circuited state occurs in the ELG element, an analog resistance value Ra (ELG-R) indicates an abnormal value. Therefore, the converted height MR-h also indicates an abnormal value. With an advancement of the lapping process, when all the heights MR-h are under 8.0 microns, the partially short-circuited state is eliminated, and the abnormal value is cancelled. Upon this cancellation, the process shifts to lapping control using the analog resistance value of the ELG elements.

(S5) When the short-circuited state has been eliminated, the operation proceeds to a warp compensating/right-and-left difference compensating process (a stage 3). Namely, the control unit 183 compensates a right-and-left difference by use of the measured height MR-h. To be more specific, the control unit 183 calculates a difference X between the height MR-h (L) of the left-end ELG element and the height MR-h (R) of the right-end ELG element, and compares the difference X with a slice level S. If the difference X is the slice level S or larger, the right-and-left difference of the row-bar 101 is conceived large and therefore compensated.

That is, the right-and-left difference is compensated in the way which follows. If the difference X does not exceed −0.03 micron, it follows that the right end of the row-bar 101 is higher by 0.03 micron (an allowance value) than the left end. Therefore, for relieving the load at the left end, the left-side cylinder 13L of the pressurization mechanism 13 is turned OFF. Then, the operation returns to the start step S5.

Whereas if the difference X exceeds 0.03 micron, it follows that the left end of the row-bar 101 is higher by 0.03 micron (the allowance value) than the right end. Therefore, for relieving the load at the right end, the right-side cylinder 13R of the pressurization mechanism 13 is turned OFF. Then, the operation goes back to the start step S5.

If the difference X is between −0.03 micron and 0.03 micron, the right-and-left difference of the row-bar 101 falls within the allowance range. Then, all the cylinders 13L, 13C, 13R of the pressurization mechanism 13 are turned ON, and the operation returns to the start step S5.

(S6) On the other hand, if the difference X is under the slice level S, the control unit 183 executes the warp compensating process which will be explained referring to FIG. 15. Then, the control unit 183 compensates the right-and-left difference. In this way, at the state 3, if the right-and-left difference is not compensated down to the slice level or under, the reason why the warp compensation is not carried out will be elucidated as follows.

Namely, at the stages 1 and 2, a correct ELG resistance value can not be obtained, and hence the warp compensation is not performed at the stages 1 and 2. Even when entering the stage 3, if the right-and-left difference is large, the warp quantity can not be correctly determined, and therefore, at the stage that the right-and-left difference decreases after executing the right-and-left difference compensating process, the warp is to be compensated.

(S7) The control unit 183 obtains the height M-Rh (G) in the position of gravity. The height MR-h(G) is calculated from an average value of an average value of the height of the ELG element in the left-end position and the height of the ELG element in the right-end position, and of the height of the ELG element in the central position. The control unit 183 judges whether or not the height MR-h(G) of the ELG element in the position of gravity becomes under a value given by (target MR-h+h2(h2<h1)). If the height MR-h(G) of the ELG element in the position of gravity does not become (target MR-h+h2) or smaller, the operation returns to the warp compensation in step S6.

(S8) The control unit 183, if the height MR-h(G) of the ELG element in the position of gravity becomes under (target MR-h+h2), proceeds to a minute right-and-left difference compensation (a stage 4). At this time, the control unit 183 controls the motor 104a to decrease the number of revolutions of the plate. The number of revolutions is 15 rpm. Then, the control unit 183 sets low all the cylinders 13L, 13C, 13R of the pressurization mechanism 13. Namely, a small load is applied, and the finishing lapping process is carried out.

(S9) The control unit 183 reads the resistance value of the ELG elements from the digital multimeter 182, and measures the height MR-h. The control unit 183 compensates the warp (see FIG. 15), and also compensates the right-and-left difference. Then, the control unit 183 judges whether or not the height MR-h(G) of the ELG element in the position of gravity is under (target value+h3(h3<h2)).

(S10) The control unit 183, when detecting that the height MR-h(G) becomes under (target value+h3), enters the finishing lapping process (a stage 5). To be specific, the control unit 183 turns OFF both the left- and right-side cylinders 13L, 13R of the pressurization mechanism 13. Accordingly, the pressurization takes place in only the central position with respect to the central cylinder 13C.

(S11) In this state, the warp shown in FIG. 15 is compensated. The control unit 183 judges whether or not the height MR-h(G) of he ELG element in the position of gravity becomes under (target value+h4(h4<h3)). The control unit 183, if the height MR-h(G) of the ELG element in the position of gravity is not under (target value+h4), compensates the warp.

(S12) The control unit 183, when the height MR-h(G) of the ELG element in the position of gravity becomes under (target value+h4), keeps a bend quantity for compensating the warp. The reason for this is that some quantity of time is needed till the warp quantity comes to zero. Accordingly, the control unit 183 keeps the bend quantity without compensating the warp in a minute error range where the height MR-h(G) of the ELG element in the position of gravity becomes under (target value+h4). The control unit 183 judges whether or not the height MR-h(G) of the ELG element in the position of gravity reaches a target value or smaller. If the height MR-h(G) of the ELG element in the position of gravity is not the target value or smaller, the operation returns to the process of keeping the bend quantity.

(S13) The control unit 183, if the height MR-h(G) of the ELG element in the position of gravity reaches the target value or smaller, performs stop control. Namely, the control unit 183 judges whether or not the oscillation sensor 153 explained in FIG. 2 is switched ON. When the oscillation sensor 153 is switched ON, as described above, it follows that the lap base 10 is located in a predetermined position P.

Then, the control unit 183 makes the pressurization cylinder 13 retract. Next, the control unit 183 operates the probe cylinder 141 to let the probe 140 move off. Subsequently, the control unit 183 operates the unload cylinder of the unload mechanism 12 to make the work 103 move off the lap plate 104. Then, the control unit 183 halts the lap plate 104, and this finishes the operation.

Thus, there are consecutively executed the lapping processes from the coarse lapping processes (such as the flattening process, the chamfering process and the right-and-left difference compensating process) to the finishing process (including the minute right-and-left difference compensation) while changing the lapping velocity.

Next, the warp compensating process will be explained with reference to FIG. 15.

(S20) The control unit 183 judges whether or not a value of a bend timer for counting a bend compensation interval is over a set bend cycle value. If the value of the bend timer is not over the bend cycle value, the control unit 183 escapes this loop.

(S21) The control unit 183, if the value of the bend timer is over the bend cycle value, judges that the bend compensation interval is reached. Therefore, the control unit 183 resets the bend timer. Then, the control unit 183 calculates a warp quantity. The warp quantity is, as shown in FIG. 16, obtained by calculating an average value of the height MR-h(L) of the left-end ELG element and the height MR-h (R) of the right-end ELG element, and subtracting the height MR-h(c) of the central ELG element from this average value.

(S22) The control unit 183 compares the calculated warp quantity with a target value. If the warp quantity is within (target value+h5), the bend cycle is set to a long value t, and escapes the loop.

(S23) The control unit 183, if the warp quantity is not within (target value+h5), judges whether the warp quantity is excessively large or not. Therefore, the control unit 183 calculates a difference between the warp quantity and the target value, and judges whether or not this difference is over 0.1 μm. The control unit 183, if this difference is over 0.1 μm, sets the bend cycle to a short cycle t/3. Whereas if this difference is not over 0.1 μm, the control unit 813 sets the bend cycle to the long cycle t.

(S24) The control unit 183 judges whether or not the difference between the warp quantity and the target value is [0] or larger. If the difference is over [0], the control unit 183 adds [0.01] to the bend quantity in order to make the bend quantity larger and outputs the bend quantity to the regulator 137-4. Whereas if the difference is not over [0], the control unit 183 subtracts [0.01] from the bend quantity in order to make the bend quantity smaller and outputs the bend quantity to regulator 137-4. Then, the control unit 183 escapes the loop.

Thus, irrespective of the initial warp quantity, the bend quantity of the bend mechanism 116 is changed stepwise by 0.01 μm. Thereafter, till the warp quantity reaches the target value, the bend quantity is gradually decreased or increased. Herein, the reason why the bend quantity is gradually controlled is that it takes much time till the work is lapping at the changed quantity from the configuration of the work has actually varied. The system allows for the time therefor. That is, a response time in the warp compensation is more delayed than in the right-and-left difference compensation, and it is therefore required that the time be taken longer than the cycle of the right-and-left compensation.

Further, the above target value of the warp quantity changes corresponding to the lapping pressure. More specifically, at the stage 3, the lapping pressure is large, and hence the target value is set to 0.08 μm. At the stage 4, the lapping pressure is intermediate, and therefore the target value is set to 0.02μm. At the stage 5, the lapping pressure is small, and therefore the target value is set to 0.00 μm. Thus, it is the reason why the target value changes corresponding to the lapping pressure that if the lapping pressure is high, there might be a possibility in which the warp quantity sharply varies, and a more margin is given to the target value as the lapping pressure becomes larger.

Furthermore, the interval of the warp compensating process, i.e., a change interval of the bend quantity changes in accordance with the difference between the warp quantity and the target value. When the difference from the target value is large, the above interval is controlled short. When the difference from the target value is small, the interval is controlled long.

Besides, there is such a characteristic that immediately after the lapping pressure has changed, the warp quantity varies. Immediately after the lapping pressure has changed, the warp quantity is in the course of a natural change. And, even if the bend control is made at that time, this control must be futile. Therefore, just after the lapping pressure has changed when starting the stage 4 and the stage 5, the bend quantity remains kept.

In addition to the embodiment discussed above, the present invention can be modified as follows:

(1) In the embodiment discussed above, the row-bar constructed of a row of magnetic heads has been exemplified as the member to be lapped, however, the present invention may be applied to the lapping of other members.

(2) The lapping monitor oriented elements taking other modes may also be used.

(3) The bend mechanism involves the use of the hydraulic cylinder, and the bend quantity can be also controlled by an oil pressure.

The present invention has been discussed so far by way of the embodiment and may be modified within the range of the gist of the present invention, and those modifications are not excluded from the scope of the present invention.

As discussed above, the present invention exhibits the following effects.

(1) The warp quantity of the work is detected during the lapping process and thus compensated, and hence even the warp caused during the lapping process can be compensated. Further, it is feasible to save the labor for measuring the warp quantity of the work before the lapping.

(2) The air pressure mechanism for applying the pressure to the work in accordance with the air supply pressure is used as the bending mechanism, whereby the minute warp quantity can be compensated and controlled to zero. Further, with the air pressure mechanism being adopted, it is possible to prevent an excessive pressure from being applied to the lap jig.

What is claimed is:

1. A lapping method of lapping a height of a work to a predetermined value, comprising:
   a step of detecting a warp quantity of said work during a lapping process; and
   a step of controlling a force of pressurization to be applied to said work so that the detected warp quantity becomes a target value,
   wherein said controlling step is performed at a predetermined bend cycle.

2. The lapping method according to claim 1, wherein further comprising a step of changing said bend cycle in accordance with a difference between the detected warp quantity and the target value.

3. The lapping method according to claim 1, wherein said controlling step includes a step of controlling the force of pressurization so that the warp quantity to be compensated at said bend cycle becomes a fixed value.

4. A lapping method of lapping a height of a work to a predetermined value, comprising:
   a step of detecting a warp quantity of said work during a lapping process; and
   a step of controlling a force of pressurization to be applied to said work so that the detected warp quantity becomes a target value,
   wherein said detecting step including:
      a step of detecting heights of measurement elements provided in both of side end positions and a central position of said work; and
      a step of calculating the warp quantity by subtracting an average value of the heights of said measurement elements provided in the positions of the two side ends, from the height of said measurement element provided in the central position of said work.

5. A lapping method of lapping a height of a work to a predetermined value, comprising:
   a step of detecting a warp quantity of said work during a lapping process;
   a step of controlling a force of pressurization to be applied to said work so that the detected warp quantity becomes a target value;
   a step of detecting heights of measurement elements provided in both of side end positions and a central position of said work; and
   a step of controlling a left side pressure and a right side pressure of said work in accordance with a difference between the detected height of said measurement element provided in a left side end position of said work and the detected height of said measurement element in a right side end position of said work, and said warp quantity detecting step including a step of calculating the warp quantity by subtracting an average value of the heights of said measurement elements provided in the positions of the two side ends, from the height of said measurement element provided in the central position of said work when said difference reaches a predetermined value.

6. A lapping apparatus for lapping a height of a work to a predetermined value, comprising:

bending means for applying a pressure force to said work; and control means for detecting a warp quantity of said work during a lapping process and controlling the pressure force of said bending means so that the detected warp quantity becomes a target value, wherein said bending means comprises means for applying the pressure force to said work in accordance with a fluid pressure, and wherein said bending means includes:

a cylinder, provided in a lap jig for holding said work, for applying a pressure to said work; and supplying means for supplying a fluid into said cylinder, and wherein said supplying means includes:

a cylinder rod taking a hollowed structure and provided at a central cylinder for applying a lapping pressure to said work in a central position of said work; and fluid supplying means for supplying a fluid to said cylinder rod, and said lap jig being formed with a hole for leading the fluid of said cylinder rod to said cylinder.

7. The lapping apparatus according to claim 6, wherein an O-ring is provided at the tip of said cylinder rod.

8. A lapping apparatus for lapping a height of a work to a predetermined value, comprising:

bending means for applying a pressure force to said work; and control means for detecting a warp quantity of said work during a lapping process and controlling the pressure force of said bending means so that the detected warp quantity becomes a target value, wherein said control means performs said controlling at a predetermined bend cycle.

9. The lapping apparatus according to claim 8, wherein said control means changes said bend cycle in accordance with a difference between the detected warp quantity and the target value.

10. The lapping apparatus according to claim 8, wherein said control means control said pressure force so that the warp quantity to be compensated at said bend cycle becomes a fixed value.

11. A lapping apparatus for lapping a height of a work to a predetermined value, comprising:

bending means for applying a pressure force to said work; and control means for detecting a warp quantity of said work during a lapping process and controlling the pressure force of said bending means so that the detected warp quantity becomes a target value, wherein said work includes measurement elements provided in both of side end positions and a central position of said work, and said control means detects heights of said measurement elements and calculates the warp quantity by subtracting an average value of the heights of said measurement elements of the two side ends, from the height of said measurement element provided in the central position of said work.

12. The lapping apparatus according to claim 11, wherein said control means controls a left side pressure and a right side pressure of said work in accordance with the detected height of said measurement element provided in a left side end position of said work and the detected height of said measurement element provided in a right side end position of said work and performs said warp quantity calculation when said difference reaches a predetermined value.

* * * * *